United States Patent
Saito et al.

[11] Patent Number: 5,308,016
[45] Date of Patent: May 3, 1994

[54] TAPE TRANSPORT WITH DIFFERENTIAL TORQUE BETWEEN TAKEUP AND FEED REELS

[75] Inventors: Yutaka Saito, Yaita; Sumiyoshi Kato, Hiki, both of Japan

[73] Assignee: Shinwa Kabushiki Kaisha, Tokyo, Japan

[21] Appl. No.: 890,756

[22] Filed: May 27, 1992

[30] Foreign Application Priority Data

May 29, 1991 [JP] Japan ................ 3-125777

[51] Int. Cl.⁵ .................................. G11B 15/26
[52] U.S. Cl. ........................ 242/201; 360/96.3
[58] Field of Search ............ 242/191, 200, 201; 360/96.3

[56] References Cited

U.S. PATENT DOCUMENTS

| | | | |
|---|---|---|---|
| 4,436,256 | 3/1984 | Saitou | 242/200 |
| 4,494,712 | 1/1985 | Godwin, Jr. et al. | 242/191 |
| 4,681,281 | 7/1987 | Aarts et al. | 242/200 |
| 4,711,410 | 12/1987 | Gwon | 242/200 |
| 5,003,418 | 3/1991 | Yang | 242/200 |

FOREIGN PATENT DOCUMENTS 61-145749 3/1986 Japan .

*Primary Examiner*—Daniel P. Stodola
*Assistant Examiner*—John Q. Nguyen
*Attorney, Agent, or Firm*—Thomas R. Morrison

[57] ABSTRACT

A tape transport mechanism that senses the end of a tape while minimizing but not eliminating back tension at the tape-feeding end. Excessive back tension causes uneven transport in fast forward or rewind. Insufficient back tension causes slack that makes sensing the end of a tape impossible. Both result from keeping the torque identical on both takeup and feed reels. The mechanism automatically switches the torque as the tape reverses so that the takeup reel always has a higher torque than the feed reel, thereby insuring that the tape end is sensed and that tape transport is even regardless of speed.

2 Claims, 5 Drawing Sheets

THE DIRECTION OF ROTATION OF THE REEL BLOCK AT THE TAPE TAKING END IN THE FORWARD MODE

→

THE DIRECTION OF ROTATION OF THE REEL BLOCK AT THE TAPE FEEDING END IN THE REVERSE MODE

THE DIRECTION OF ROTATION OF THE REEL BLOCK AT THE TAPE TAKING END IN THE FORWARD MODE

←

THE DIRECTION OF ROTATION OF THE REEL BLOCK AT THE TAPE FEEDING END IN THE REVERSE MODE

THE DIRECTION OF ROTATION OF THE REEL BLOCK AT THE TAPE TAKING END IN THE FORWARD MODE

THE DIRECTION OF ROTATION OF THE REEL BLOCK AT THE TAPE FEEDING END IN THE REVERSE MODE

THE DIRECTION OF ROTATION OF THE REEL BLOCK AT THE TAPE TAKING END IN THE FORWARD MODE

THE DIRECTION OF ROTATION OF THE REEL BLOCK AT THE TAPE FEEDING END IN THE REVERSE MODE

TAPE TRANSPORT WITH DIFFERENTIAL TORQUE BETWEEN TAKEUP AND FEED REELS

BACKGROUND OF THE INVENTION

1. Field of the Invention

The present invention relates to a tape transport monitoring device of a tape player which detects the end of a tape by detecting rotation of a pair of reels for taking up a tape, more particularly, to a tape, transport mechanism which is capable of automatically adjusting, at the tape-takeup end and the tape-feeding end, the torque of the reel blocks and a detecting portion for actuating tape end detecting means.

2. Description of the Prior Art

As described, for example, in Japanese Patent Publication No. 145749/1986, a conventional tape player of this type has a pair of reel blocks for taking up a tape, rotary disks in friction contact with the pair of reel blocks and rotated together with them, a rotation detection arm oscillated by rotation of the rotary disks, and tape end detecting means for detecting a tape end by detecting the cessation of oscillation of the rotation detection arm. Rotation of the reel blocks stops when a tape has been taken up to the end so that the rotation detection arm, which is rotated by the rotary disk in friction contact with the reel block at the tape-takeup end, ceases to rotate, thereby actuating the tape end detecting means. According to this conventional structure, tension of the reel blocks at the tape-takeup end and the tape-feeding end are identical, hence tension of the rotary disks rotated by means of friction contact with their respective reel blocks, are identical.

With a tape player having the above conventional structure, wherein rotary disks rotated by friction contact with the reel block at the tape-takeup end and the reel block at the tape-feeding end respectively have identical torques, unless considerable pressure is applied to the rotation detection arm which is connected through friction to the reel block at the tape-takeup end, it is not possible to actuate the rotation detection arm to detect a tape end at the tape-takeup end. However, if the rotation torque of the rotary disk at the tape-feeding end, which is in frictional contact with the reel block at the tape-feeding end, is identical to that of the other torque, it makes the rotation torque at the tape-feeding end excessively large. As a result, when a button or switch is operated to actuate the fast forward or fast rewind operation, the operation is not always conducted smoothly due to back tension at the tape-feeding end, which causes uneven transport of the tape. On the other hand, in cases where there is no or little back tension at the tape-feeding end, a tape may slacken and be caught between a pinch roller and a capstan, thereby making detection of the tape end impossible.

In order to solve the above problems, the present invention has as its object the provision of a tape transport mechanism of a tape player which is capable of automatically switching the magnitude of the torque so that the torque of the reel block at the tape-takeup end and the rotary disk corresponding thereto is always greater than the torque of the reel block feeding out the tape and the rotary disk corresponding thereto. This ensures detection of a tape end, and conveys a tape evenly in the fast forward mode with the absolute minimum necessary back tension at the tape-feeding end.

SUMMARY OF THE INVENTION

A tape transport mechanism of a tape player according to the present invention consists of a pair of reel blocks for taking up a tape; a pair of rotary disks respectively in friction contact with the pair of reel blocks and rotated by rotation of the reel blocks; a detecting portion operated by rotation of the pair of rotary disks; and end detecting means for detecting the end of a tape by detecting ceasing of operation of the detecting portion; wherein: the torque of one of the pair of reel blocks, more precisely the one taking up the tape, and the rotary disk which is in friction contact with the reel block is greater than the torque of the rotary disk in friction contact with the other reel block, i.e., the one feeding the tape.

A tape transport mechanism of a tape player according to the present invention has such a structure that the torque generated by friction contact between whichever of the two reel blocks that is taking up a tape and the rotary disk corresponding thereto is greater than the torque of frictional contact between the other reel block and the rotary disk corresponding thereto. Consequently, even if back tension is applied to the reel block at the tape-feeding end, the large torque of the reel block at the tape-takeup end and its rotary disk ensures steady takeup of a tape. Furthermore, as the rotary disks obtain a torque sufficient for stopping the rotation detection arm, tape end detection and smooth fast forward operation are ensured. As a result, taking up a tape occurs without any fluctuation in transport speed or causing slack of a tape.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
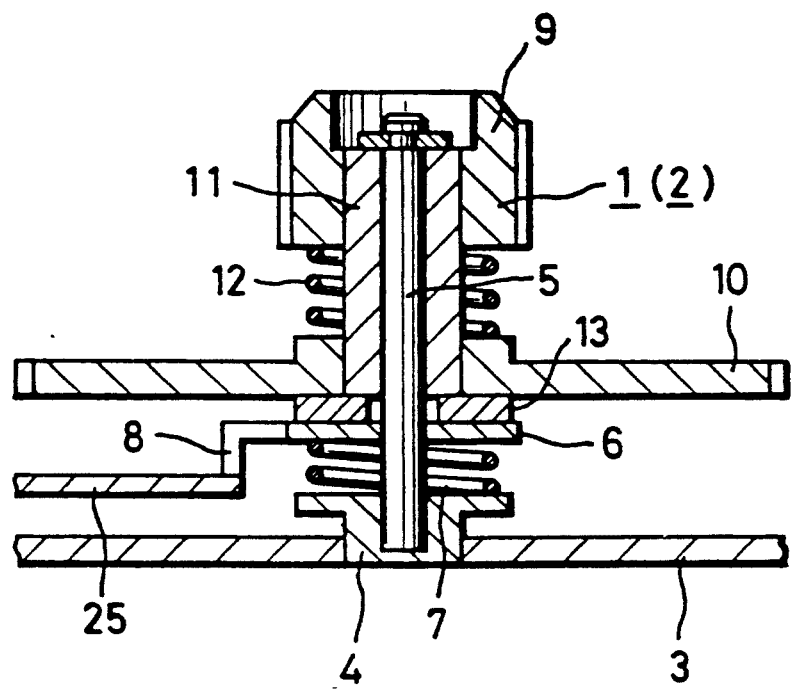
FIG. 1 is a vertical front sectional view of a tape transport mechanism of a tape player according to an embodiment of the present invention.

The structure of an embodiment of a tape transport mechanism of a tape player according to the present invention is explained hereunder, referring to the drawings.

Figure 2:
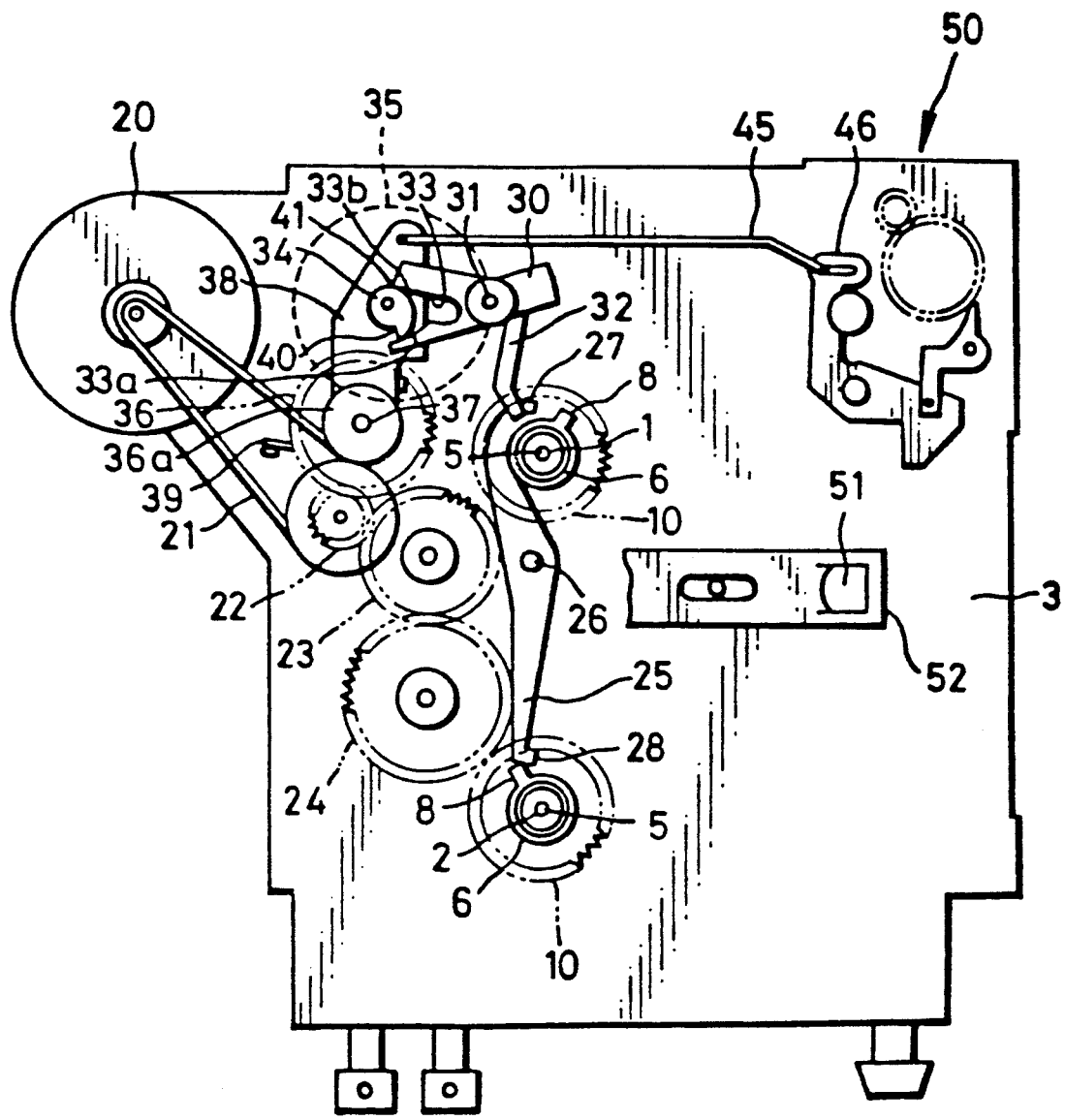
FIG. 2 is a plan of the base board of the tape player.

In FIGS. 1 and 2, each of a pair of reel blocks 1, 2, is attached to a shaft 5 rotatably supported by a bearing 4 attached to a base board 3. Each shaft 5 rotatably supports a rotary disk 6. A coil spring 7 coiled around shaft 5 is fitted between the bottom of rotary disk 6 and bearing 4, with the ends of the coil spring respectively engaged with rotary disk 6 and bearing 4. A catching portion 8 is formed on each rotary disk 6 in such a manner that catching portion 8 projects vertically from the outer rim of the disk, respective positions of catching portions 8 in relation to their rotary disks 6 are different from each other.

Each of reel blocks 1, 2 consists of a reel base 9, a gear portion 10, and a cylindrical supporting shaft portion 11 for supporting reel base 9 so that reel base 9 is movable in the axial direction, with reel base 9 and gear portion 10 attached to supporting shaft portion 11, and a coil spring 12 wound around supporting shaft portion 11 and positioned between reel base 9 and gear portion 10. Supporting shaft portion 11 is rotatably fitted on shaft 5 so that reel base 9 and gear portion 10 are rotated together with supporting shaft portion 11.

A rotation transmission member 13 made of felt or other similar material is disposed between gear portion 10 of reel blocks 1, 2 and rotary disk 6 to connect gear portion 10 to rotary disk 6 by means of friction. Rotation transmission member 13 is pressed between gear portion 10 and rotary disk 6 by spring 7 for applying pressure on rotary disk 6.

Figure 3:
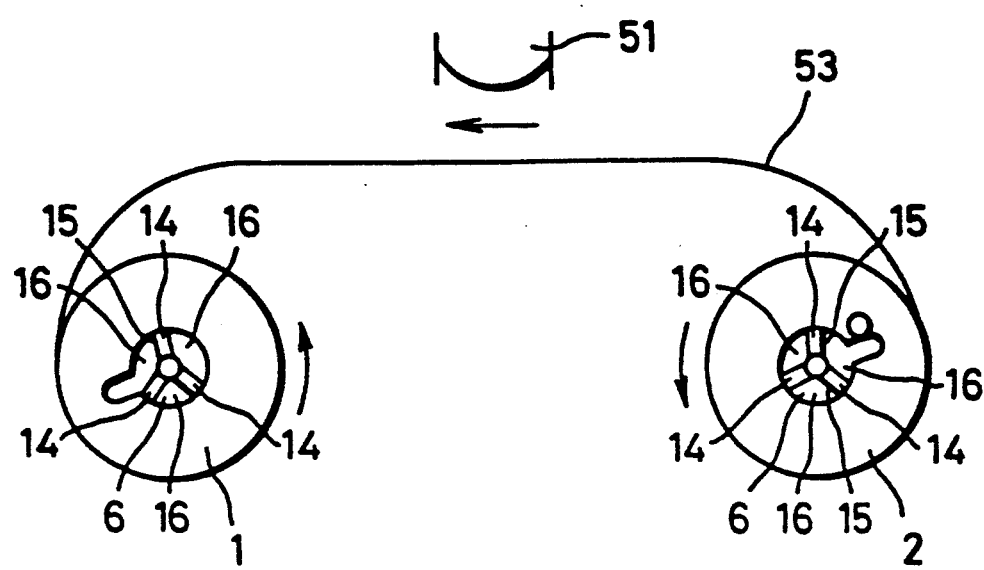
FIG. 3 is an explanatory drawing of the tape player in the tape forward mode.
Figure 4:
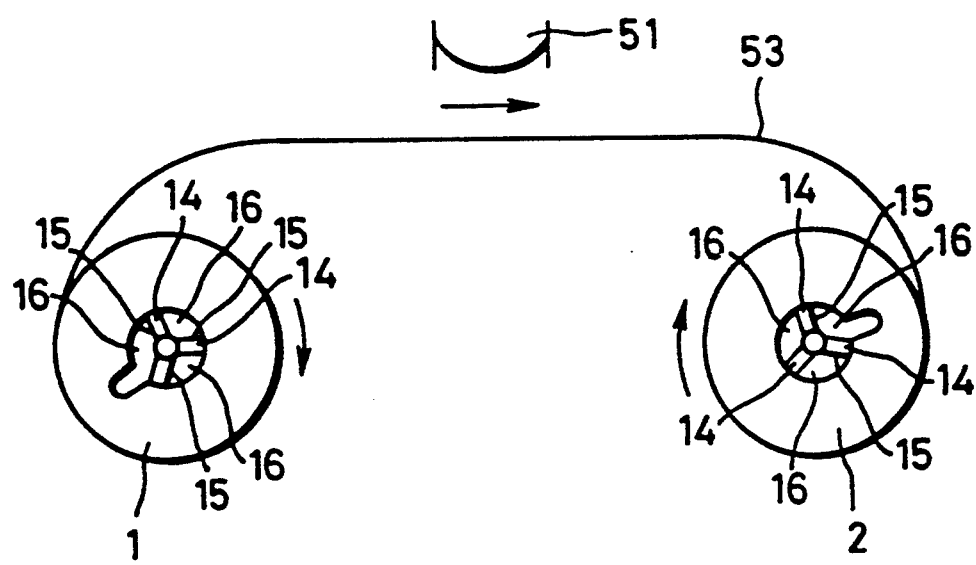
FIG. 4 is an explanatory drawing of the tape player in the tape reverse mode.
Figure 5:
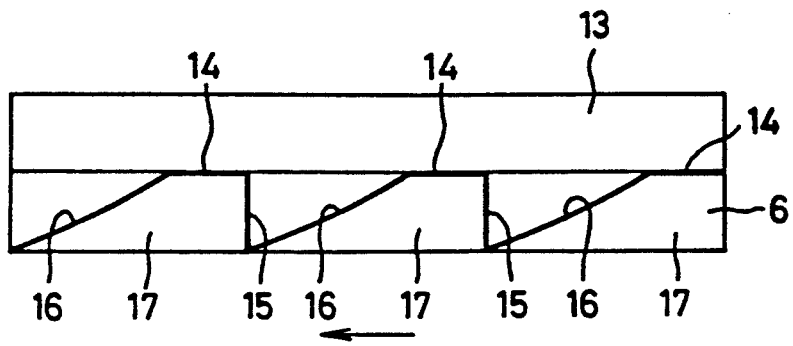
FIG. 5 is an explanatory drawings of a rotary disk at one of the reel blocks of the tape player.
Figure 6:
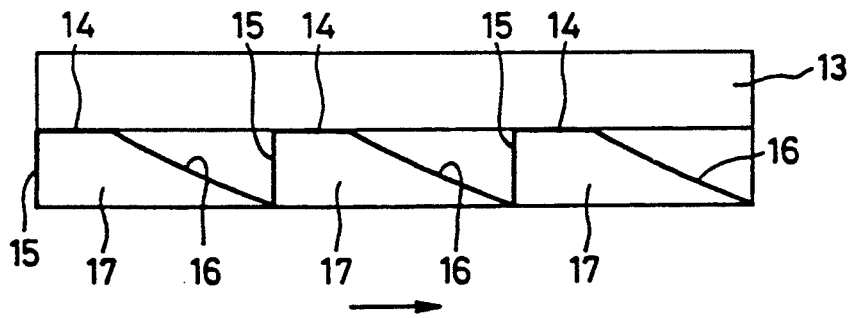
FIG. 6 is an explanatory drawing of the rotary disk at the other reel block of the tape player.

Referring to FIGS. 3-6 rotary frictional contact surface 14 in contact with rotation transmission member 13. Notched in frictional contact surface 14 are catching ridges 17 at, for example, 120° intervals as shown in FIGS. 5 and 6, each ridge 17 having a vertical surface 15 in the direction of the end towards which rotation is transmitted when a tape is taken up and an inclined surface 16 at the other end so that the torque of frictional contact when rotated in the direction of reel block 1 or 2, whichever is the take up, is greater than the torque of frictional contact when rotated in the direction of reel block 1 or 2, whichever serves the feeding end of the tape. Catching ridges 17 are formed on the pair of rotary disks 6, which are rotatably connected to respective reel blocks 1 and 2, so that the ridges on the two rotary disks are symmetrical to each other and receive the rotation torque of rotary disk 6 at the tape takeup end. Tension on the tape from rotary disk 6 at the take-up end is set, for example, at approximately 5 to 10 g, and at the tape feeding end at approximately 1 to 2 g.

Referring again to FIG. 2, an electric motor 20 is attached to base board 3. A driving gear 22 is rotated by a belt 21 driven by motor 20 rotatably supported by base board 3 through a shaft. Engaged with driving gear 22 is a first transmission gear 23 rotatably supported by base board 3 through a shaft. The first transmission gear 23 is engaged with a second transmission gear 24 which is supported by base board 3 through a shaft. An idle gear which is not shown in the drawings is positioned to engage gear portion 10 of either one of reel blocks 1, 2 and either of first and second transmission gears 23, 24.

A rotation detection arm 25 which serves as the detecting portion is rotatably attached to base board 3 through a shaft 26. Catching pieces 27, 28 for respectively engaging catching portions 8 of rotary disks 6 are formed at both ends of rotation detection arm 25 by bending the ends of the arm at right angles so that rotation of rotation disks 6, which are in frictional contact with reel blocks 1, 2, causes catching portions 8 of rotation disks 6 to alternately abut with pressure against catching pieces 27, 28 of rotation detection arm 25, thereby causing rotation detection arm 25 to oscillate and rotate around shaft 26. Further, the distance catching portion 27 of rotation detection arm 25 can move in a clockwise direction is limited by a stopper (not shown) projecting from base board 3.

A detector 30 is attached to base board 3 by shaft 31 near reel block 1. Detector 30 is provided with a catching arm 32 projecting from detector 30, with its end capable of engaging catching piece 27 at one end of rotation detection arm 25. Formed at one end of detector 30 is a catching recess 33, in which a cam 34 slides while rotating. A cam gear 35 rotated together with cam 34 engages a transmission gear 36 continuously through an intermediate gear 36a which engages and is driven by driving gear 22. Cam 34 and cam gear 35 are rotatably supported by an oscillating arm 38 which is rotatably supported by a shaft 37 of transmission gear 36. Shaft 37 of transmission gear 36 is attached to base board 3. Oscillating arm 38 is pressed by a spring 39 in the direction in which cam 34 engages catching recess 33 of detector 30.

Cam 34 has a cam ridge 40 so that rotation of cam 34 causes detector 30 to oscillate around shaft 31. When a tape is completely taken up, thereby stopping rotation of reel blocks 1, 2, ridge 40 of cam 34 engages with an edge 33a of catching recess 33 as shown in FIG. 2, catching arm 32 abuts against catching piece 27 of rotation detection arm 25 and becomes unable to rotate. At that time, detector 30 is held where it is, and cam ridge 40, as a result of the continuing rotation of cam 34, comes to engagement with the open end of an other edge 33b of catching recess 33, thereby causing cam 34 held in catching recess 33 to be unable to rotate. Pressure of cam ridge 40 of cam 34 applied to edge 33b of catching recess 33 corresponds to the direction of shaft 31 of detector 30, oscillating arm 38 supporting cam 34 is rotated, with detector 30 not being rotated. Therefore, cam 34 comes off an open end 41 of catching recess 33 and resumes its rotation, removing cam ridge 40 of cam 34 from the position where cam ridge 40 is in engagement with open end 41 of edge 33b. Then, as a result of reverse rotation of oscillating arm 38, which is continuously pressed by spring 39, cam 34 again engages catching recess 33.

Oscillating arm 38 is connected by a connecting rod 45 to a reversing mechanism 46 which automatically switches the direction of takeup of a tape.

Detector 30, cam 34, oscillating arm 38 and other parts described above comprise a tape end detecting means 50. When reverse mechanism 46 is actuated, pinch rollers (not shown) are alternately switched, and the idle gear (not shown) is also switched between engagement with gear portions 10 of either reel block 1 or 2. Thus, the direction of takeup of a tape is switched.

In the drawings, a head 51 is attached to a sliding plate 52 which is slidably attached to base board 3.

The function of the present embodiment is explained hereunder.

At the time of recording, replay, fast forward or fast reverse, reel blocks 1, 2 are rotated by the driving force of motor 20. When reel blocks 1, 2 rotate, their rotary disks 6, which are respectively connected to reel blocks 1, 2 by friction with rotation transmission members 13, also rotate. As a result of the rotation of rotary disks 6, rotation detecting arm 25, whose catching pieces 27, 28 have been alternately pushed by catching portions 8, rotates counterclockwise as shown in FIG. 2. Having been pushed by catching piece 27, catching arm 32 of detector 30 rotates clockwise as shown in FIG. 2, and clockwise rotation of cam 34 causes detector 30 to rotate counterclockwise as shown in FIG. 2. Catching arm 32 then pushes catching piece 27 of rotation detection arm 25, thereby rotating rotation detection arm 25 clockwise. Thus, when a tape is moving, reel blocks 1, 2 rotate, and rotation detection arm 25 and detector 30 oscillate back and forth.

When a tape has been completely taken up, tension applied to the tape causes the pair of reel blocks 1, 2 to cease their rotation. When reel blocks 1, 2 cease to rotate, rotation of rotary disks 6, as well as oscillation of rotation detection arm 25 and detector 30, also stops. Then, under the above condition, when cam ridge 40 of cam 34, 7hich is still rotating in and against catching recess 33 of detector 30, comes to engagement with open end 41 of edge 33b of catching recess 33 of detector 30, oscillating arm 38 is rotated counterclockwise, resisting spring 39, as shown in FIG. 2. Rotation of oscillating arm 38 actuates reversing mechanism 46 through connecting rod 45. As a result, when in the record mode or play mode, the direction of transport of the tape is switched, and, when in the fast forward mode, the tape ceases to move.

As shown in FIGS. 5 and 6, catching ridges 17 are notched in frictional contact surface 14 of each rotary disk 6, which is in contact with rotation transmission member 13. When a tape is moving, the torque generated by frictional contact when rotating in the direction of reel block 1 or 2 that is taking up the tape is greater than the torque generated by frictional contact when rotating in the direction of the reel block that is feeding the tape. The side of a catching ridge to which rotation is transmitted when taking up a tape is a vertical surface 15 and the other side is an inclined surface 16. Therefore, as shown in FIGS. 3 and 4, where reel block 1 is taking up a tape, the torque of frictional contact between reel block 1 and its rotary disk 6 is greater than that between the other reel block, i.e., reel block 2, and its rotary disk 6, while in cases where reel block 2 is taking up a tape, the torque of frictional contact between reel block 2 and its rotary disk 6 is greater than that between reel block 1 and its rotary disk 6. As a consequence, there is no danger that a tape may slacken or become entangled between a pinch roller and a capstan.

As torque between the reel block at the takeup end and its rotary disk 6 is large, in spite of back tension on the reel block feeding out the tape, the takeup operation is so reliable so that rotary disk 6 unfailingly terminates oscillation of rotation detection arm 25. Furthermore, as rotation torque large enough to stop oscillation of detector 30 is developed, tape-end detection is operated reliably, thus making the fast forward operation smooth.

Figure 7:
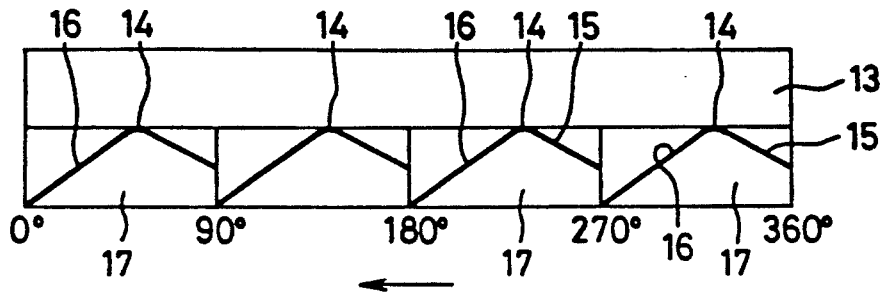
FIG. 7 is an explanatory drawing of a rotary disk at one of the reel blocks of a tape transport mechanism of a tape player according to another embodiment of the present invention.
Figure 8:
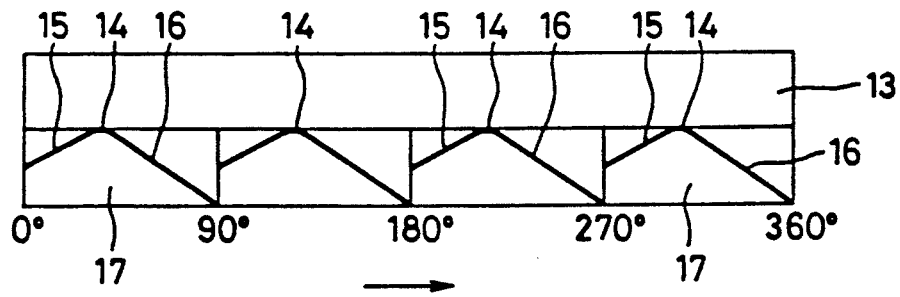
FIG. 8 is an explanatory drawing of the rotary disk at the other reel block of the other embodiment in the tape reverse mode.

According to the present embodiment, catching ridges 17 are formed at 120° intervals on rotary disks 6 so that torque generated by frictional contact when rotating in the direction of reel block 1 or 2 that is taking up the tape is greater than torque generated by frictional contact when rotating in the direction of the reel block that is feeding the tape, with the side of a catching ridge to which rotation is transmitted when taking up a tape being a vertical surface 15 and the other side being an inclined surface 16. However, catching ridges 17 do not necessarily have a vertical side. As shown in FIGS. 7 and 8, both sides of a ridge may be inclined surfaces 15 and 16 having different angles of inclination so that torque generated by frictional contact when rotating in the direction of reel block 1 or 2 that is taking up the tape is greater than torque generated by frictional contact when rotating in the direction of the reel block feeding the tape. Furthermore, the torque may be reduced by making inclined surfaces 16 of catching ridges 17 curved surfaces.

It is also possible to form a ridge at an end of frictional contact surface 14, which contacts rotation transmission member 13, of each rotary disk 6, more precisely, the end towards which rotation is transmitted when taking up a tape, in such a manner that the torque when the disk rotates to take up a tape is greater than the torque when feeding a tape.

Although rotation detection arm 25 is structured to oscillate and rotate according to the embodiment described above, a reciprocating detection arm which advances and retreats may be used instead.

According to the present invention, the system is automatically switched to ensure that the torque between the reel block taking up a tape and the rotary disk corresponding thereto is greater than the torque between the reel block feeding out the tape and its corresponding rotary disk, and sufficient torque is developed for causing a detecting portion to actuate the tape end detecting means when the reel blocks halt upon completion of the takeup of a tape. Therefore, according to the present invention a tape end is reliably detected, and any undesired effect on the transport of a tape is prevented by developing the absolute minimum back tension.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape transport mechanism comprising:
   a first reel block for transporting a tape in a first direction;
   a second reel block for transporting said tape in a second direction;
   a first rotating disk in frictional drive relationship with said first reel block;
   a second rotating disc in frictional drive relationship with said second reel block;
   first frictional means for producing greater frictional torque on said first reel block when it transports tape in said first direction than is produced on said second reel block when said second reel block is feeding tape in said first direction; and
   second frictional means for producing greater frictional torque on said second reel block when it transports tape in said second direction than is produced on said first reel block when said first reel block is feeding tape in said second direction;
   said first and second frictional means comprising catching ridges on said first and second rotating disks, said catching ridges each having opposite side surfaces, one side surface of each catching ridge being disposed at a greater angle relative to a disk frictional contact surface than the opposite side surface, said catching ridges being oriented on said first and second rotating disks such that the said one side surface thereof face in the associated reel block tape transport direction so as to provide during tape transport with a reel block, greater friction inducing contact with the rotating disk, and correspondingly greater frictional torque in the associated reel block than is produced in the other reel block which is feeding tape.

2. A tape transport mechanism comprising:

a first reel block for transporting a tape in first and second directions;

a second reel block for transporting said tape in said first and second directions;

a first rotating disk in frictional drive relationship with said first reel block;

a second rotating disk in frictional drive relationship with said second reel block;

first frictional means comprising catching ridges on said first and second rotating disks;

said catching ridges on said first rotating disk having inclined edges oriented such as to be effective for producing greater frictional torque on said first reel block when it is transporting tape in said first direction than frictional torque produced on said second reel block &eeding tape in said first direction;

said catching ridges on said second rotating disk having inclined edges oriented such as to be effective for producing lower frictional torque on said second reel block when it is feeding tape in said first direction than frictional torque produced on said first reel block when said first reel block is transporting tape in said first direction;

second frictional means comprising catching ridges on said first and second rotating disks;

said catching ridges on said second rotating disk having inclined edges oriented such as to be effective for producing greater frictional torque on said second reel block when it is transporting tape in said second direction, than frictional torque produced on said first reel block when said first reel block is feeding tape in said second direction; and said catching ridges on said first rotating disk having inclined edges oriented such as to be effective for producing lower frictional torque on said first reel block when it is feeding tape in said second direction, than frictional torque produced on said second reel block when said second reel block is transporting tape in said second direction.

* * * * *